3,305,917
CUTTING BLADE
Günther Grassmann, Eddesse uber Peine, Germany
Filed May 28, 1964, Ser. No. 370,973
Claims priority, application Germany, May 28, 1963,
G 37,835
5 Claims. (Cl. 29—103)

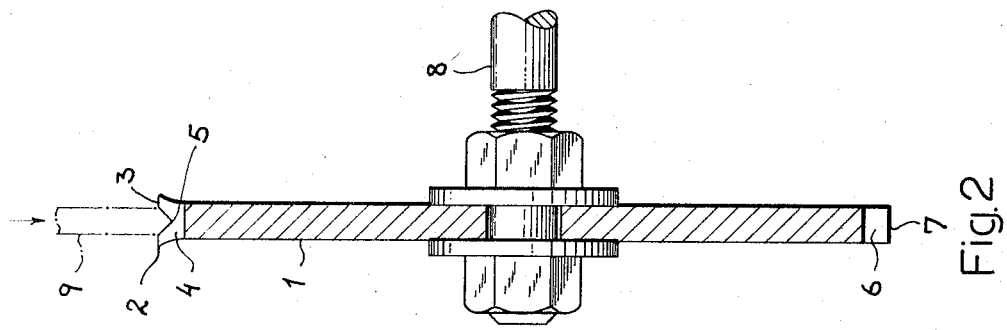
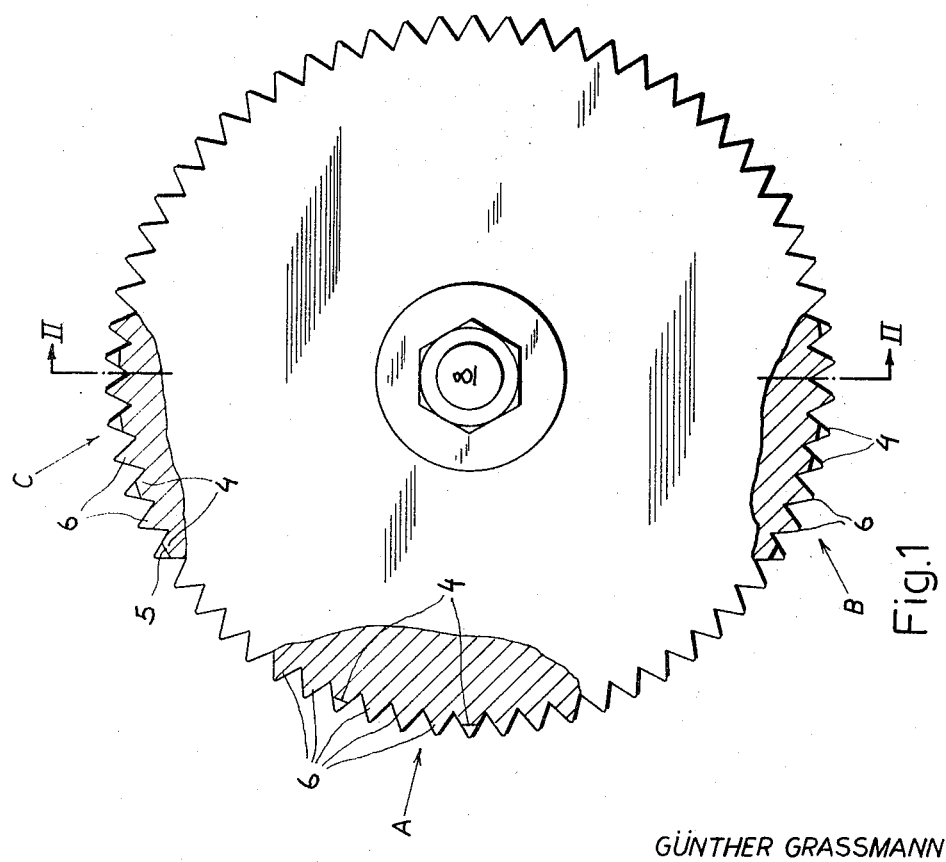

My present invention relates to a cutting blade, more specifically to a blade for a hot-milling cutter, having teeth which projects sideways beyond the lateral surfaces of the blade body to provide a suitable clearance or rake.

In cutting blades, such as those used for the milling of hot ingots, the desired rake is conventionally produced by upsetting or otherwise reinforcing a peripheral zone of the cutter when forming the teeth in that zone. While this expedient greatly reduces the area of contact between the blade surfaces and the workpiece, thereby diminishing the friction encountered during the cutting operation, there still remains a zone of appreciable width throughout which the blade engages the workpiece without lateral clearance. This results in a relatively rapid wearing of the sawteeth on the cutter and frequently necessitates a reshaping of the teeth by expensive and complicated machinery which must be used in order to subject the blade to another peripheral upsetting process.

The general object of my invention is to provide a cutting blade of the character set forth in which the aforestated disadvantages are avoided.

A more particular object of this invention is to provide a cutting blade of this type whose teeth, when worn, may be reshaped in a simple manner and which affords the necessary lateral clearance without the need for peripheral upsetting of the blade body.

It is also an object of this invention to provide a process for quickly and conveniently setting a series of sawteeth, specifically on a milling cutter for the purpose indicated above, in a manner insuring the greatest possible reduction of friction between the blade body and the workpiece.

The foregoing objects are realized, in accordance with my present invention, by the provision of a cutting blade having selected teeth whose cutting edges are split substantially midway by wedge-shaped notches whereby each of these teeth is spread out sideways beyond the lateral blade surfaces. Advantageously, pursuant to a further feature of my invention, the teeth so split are arranged to alternate—individually or in small groups—with other teeth that have not been notched and therefore present a continuous cutting edge, these latter teeth serving primarily as trimmers to remove the burr left by the notches of the rake teeth.

The invention will be described hereafter in greater detail, reference being made to the accompanying drawing in which:

FIG. 1 is a side view of a milling blade embodying the invention; and

FIG. 2 is a cross-sectional view taken on line II—II of FIG. 1.

The blade 1 shown in the drawing has the usual shape of a circular disk, its body being bounded by a pair of flat parallel sides as clearly seen in FIG. 2. It is formed with a peripheral array of teeth 4 and 6 of conventional, identical triangular profile integral with the blade body, the cutting edges 3 and 7 of these teeth being parallel to the blade axis and lying on a common circle centered on the axis of an associated shaft 8. In contradistinction to the teeth 6, however, the teeth 4 have their cutting edges 3 broadened so that the corners of the triangular profile project at 2 beyond the lateral surfaces of blade 1. This broadening is accomplished, as illustrated diagrammatically in FIG. 2, with the aid of a wedge-shaped tool 9 whose point is driven centrally into the edge 3 to form a V-shaped notch 5 therein. As a result of this splitting action, which does not involve any chip-removing operation, the two cutting edges of each tooth 4, which lie on a line perpendicular to the broad sides of the tool body 1, have a combined length substantially equal to the thickness of that body as is apparent from FIG. 2.

The notched teeth 4 alternate with unnotched teeth 6 in any convenient order, the teeth 6 serving primarily to trim off the material left standing by the notches 5 of the teeth 4. If, for example, the initial tooth disposition is a group of three unnotched teeth 6 between any two notched teeth 4, as shown at A in FIG. 1, then, upon excessive wear of the notched teeth, some of the hitherto unaltered trimmer teeth 6 may be converted into rake teeth 4 by notching so that the order may become two notched teeth 4 followed by two unnotched teeth 6 etc., as shown at B, or a single notched tooth 4 followed by a single unnotched tooth 6, as indicated at C.

Since the toothed periphery of blade 1 encounters relatively little friction during high-speed rotation in contact with a workpiece (not shown), its sawtooth structure will experience relatively little wear so that resharpening and reshaping of the cutting edges need not be carried out at frequent intervals. A comparison with conventional cutters of the reinforced-edge type shows, therefore, a considerably increased useful life for my improved blade.

I claim:

1. A cutter blade for the milling of hot ingots, said blade having a body integrally provided with a succession of sawteeth, certain of said sawteeth having cutting edges split by wedge-shaped notches into oppositely inclined positions spread out sideways beyond the lateral surfaces of said body, said portions having cutting edges aligned in a direction perpendicular to said lateral surfaces with a combined length of said cutting edges substantially equal to the thickness of said body.

2. A cutter blade for the milling of hot ingots, said blades having a body integrally provided with a succession of sawteeth, certain of said sawteeth having cutting edges split by wedge-shaped notches into oppositely inclined portions spread out sideways beyond the lateral surfaces of said body, the remaining ones of said sawteeth having continuous cutting edges and sides flush with said lateral surfaces, said portions having cutting edges aligned in a direction perpendicular to said lateral surfaces with a combined length of said cutting edges substantially equal to the thickness of said body.

3. A milling cutter for the cutting of hot ingots comprising a circular blade integrally provided with a succession of peripheral teeth, certain of said teeth having cutting edges split by wedge-shaped notches into oppositely inclined portions spread out sideways beyond the lateral surfaces of said blade, said portions having aligned cutting edges parallel to the blade axis with a combined length substantially equal to the thickness of said blade.

4. A milling cutter for the cutting of hot ingots comprising a circular blade integrally provided with a succession of peripheral teeth, certain of said teeth having cutting edges split by wedge-shaped notches into oppositely inclined portions spread out sideways beyond the lateral surfaces of said blade, the remaining ones of said teeth having continuous cutting edges and sides flush with said lateral surfaces, said portions having aligned cutting edges parallel to the blade axis with a combined length substantially equal to the thickness of said blade.

5. A milling cutter as defined in claim 4 wherein the teeth having split cutting edges alternate with the teeth having continuous cutting edges.

References Cited by the Examiner

UNITED STATES PATENTS

| | | | |
|---|---|---|---|
| 214,390 | 4/1879 | Hill | 143—133 |
| 298,886 | 5/1884 | Peak | 143—133 |
| 854,102 | 5/1907 | Mutsch | 143—133 |
| 1,820,434 | 8/1931 | Busque | 143—141 |
| 2,338,990 | 1/1944 | Wenzel | 76—101 |
| 2,476,749 | 7/1949 | Marsh | 29—103 |
| 2,614,441 | 10/1952 | Goddard | 76—101 |
| 2,658,260 | 11/1953 | Hage | 29—103 |
| 3,082,506 | 3/1963 | Jensen | 143—133 X |

FOREIGN PATENTS 546,114   6/1942   Great Britain.

WILLIAM W. DYER, Jr., *Primary Examiner.*

HARRISON L. HINSON, *Examiner.*